(12) United States Patent  
Venture et al.

(10) Patent No.: US 7,821,416 B2  
(45) Date of Patent: Oct. 26, 2010

(54) DETECTOR SYSTEM FOR DETECTING THE DIRECTION IN WHICH AN ITEM PASSES THROUGH A DETERMINED BOUNDARY ZONE

(75) Inventors: Guy Venture, Senas (FR); Jérôme Lievre, Villennes sur Seine (FR)

(73) Assignee: NEOPOST Technologies, Bagneux (FR)

( * ) Notice: Subject to any disclaimer, the term of this patent is extended or adjusted under 35 U.S.C. 154(b) by 1206 days.

(21) Appl. No.: 11/046,632

(22) Filed: Jan. 27, 2005

(65) Prior Publication Data

US 2005/0195083 A1    Sep. 8, 2005

(30) Foreign Application Priority Data

Jan. 30, 2004   (FR)   .................................. 04 00937

(51) Int. Cl.  
*G08B 21/00* (2006.01)
(52) U.S. Cl. .................. 340/673; 324/165; 340/995.28; 235/462.46
(58) Field of Classification Search ................. 340/673, 340/995.28; 324/165; 235/462.46  
See application file for complete search history.

(56) References Cited

U.S. PATENT DOCUMENTS

| | | | | |
|---|---|---|---|---|
| 4,639,716 | A | | 1/1987 | Payne .......................... 340/571 |
| 5,708,423 | A | * | 1/1998 | Ghaffari et al. ............... 340/5.8 |
| 5,712,789 | A | * | 1/1998 | Radican ....................... 700/226 |
| 6,427,913 | B1 | * | 8/2002 | Maloney ..................... 235/383 |
| 6,600,418 | B2 | * | 7/2003 | Francis et al. ............ 340/572.1 |
| 6,687,609 | B2 | * | 2/2004 | Hsiao et al. .................. 701/207 |
| 6,884,989 | B2 | * | 4/2005 | Murata ........................ 250/221 |
| 7,034,683 | B2 | * | 4/2006 | Ghazarian ................ 340/568.1 |
| 7,082,344 | B2 | * | 7/2006 | Ghaffari ...................... 700/115 |
| 7,295,114 | B1 | * | 11/2007 | Drzaic et al. ............. 340/572.1 |
| 7,333,016 | B2 | * | 2/2008 | Ancel ....................... 340/572.1 |
| 7,380,723 | B1 | * | 6/2008 | Oget ...................... 235/462.46 |
| 7,408,462 | B2 | * | 8/2008 | Pirkl et al. ................... 340/557 |
| 2002/0070862 | A1 | * | 6/2002 | Francis et al. ............ 340/572.1 |
| 2002/0174367 | A1 | * | 11/2002 | Kimmel et al. ............. 713/201 |
| 2003/0201321 | A1 | * | 10/2003 | Maloney ..................... 235/384 |
| 2003/0233189 | A1 | * | 12/2003 | Hsiao et al. .................. 701/207 |
| 2008/0231228 | A1 | * | 9/2008 | Fowler et al. ................ 320/107 |
| 2009/0153333 | A1 | * | 6/2009 | Zhang et al. .............. 340/572.4 |

FOREIGN PATENT DOCUMENTS

| | | |
|---|---|---|
| EP | 1 065 625 A1 | 1/2001 |
| EP | 1 220 163 A1 | 7/2002 |
| JP | 08263714 | 10/1996 |
| WO | WO 02/071340 A1 | 9/2002 |

* cited by examiner

*Primary Examiner*—Daniel Wu  
*Assistant Examiner*—Bradley E Thompson  
(74) *Attorney, Agent, or Firm*—Sughrue Mion, PLLC

(57) ABSTRACT

The invention relates to a goods transport vehicle including a detector system for detecting the direction in which an item passes through a loading/unloading door on the vehicle, the detector system including:

a first read-interrogate element including a first antenna having a first detection lobe, the first read-interrogate element monitoring a first region situated on one side of the loading/unloading door;

a second read-interrogate element including a second antenna having a second detection lobe that does not overlap the first detection lobe, the second read-interrogate element monitoring a second region situated on the other side of the loading/unloading door; and processor means connected to the first and second read-interrogate elements, the processor means determining the direction in which the item passes through as a function of the order in which the two regions are crossed.

8 Claims, 2 Drawing Sheets

DETECTOR SYSTEM FOR DETECTING THE DIRECTION IN WHICH AN ITEM PASSES THROUGH A DETERMINED BOUNDARY ZONE

CROSS-REFERENCE TO RELATED APPLICATIONS

This applications claims priority from French Patent Application No. 04 00937 filed Jan. 30, 2004.

FIELD OF THE INVENTION

The present invention relates to the field of transport logistics and of parcel, packet, or pallet handling.

PRIOR ART

The use of Radio Frequency Identification Device (RFID) technology is well known in logistics for tracking and identifying parcels and for processing information relating to all of the operations and services involved in the entire transport chain.

However, the essential problem of determining whether a parcel is inside or outside a precise space, such as a vehicle, whose threshold it has crossed, has not yet been addressed.

That problem arises frequently in the field of transport logistics in which numerous parcels are mislaid or stolen.

OBJECT AND SUMMARY OF THE INVENTION

An object of the present invention is thus to solve the above-mentioned problem by proposing a detector system for detecting an item passing through a determined boundary zone that guarantees that said item is on one side or the other of said boundary.

To this end, the present invention provides a goods transport vehicle including a detector system for detecting the direction in which an item passes through a loading/unloading door on the vehicle, wherein said detector system comprises:

a first read-interrogate element including a first antenna having a first detection lobe, the first read-interrogate element monitoring a first region situated on one side of said loading/unloading door;

a second read-interrogate element including a second antenna having a second detection lobe that does not overlap the first detection lobe, the second read-interrogate element monitoring a second region situated on the other side of said loading/unloading door; and processor means connected to the first and second read-interrogate elements, the processor means determining the direction in which the item passes through as a function of the order in which said two regions are crossed.

Thus, the first read-interrogate element monitors a space situated on one side of the loading/unloading door, and the second read-interrogate element monitors the space situated on the other side, the travel direction being determined by the order in which the two spaces on either side of the door of the vehicle are crossed. This system thus makes it possible to solve the problem of misdirected items since each item (which may be a parcel or a pallet) is tracked.

Advantageously, the processor means further determine identification data relating to the item.

According to a feature of the invention, the detector system further includes wireless communications means for transmitting identification data and data relating to the travel direction of the item to management means external to the vehicle.

According to a feature of the invention, the detector system further includes wired communications means for transmitting identification data and data relating to the travel direction of the item to management means external to the vehicle, and the data is transmitted between the wired communications means and the management means via a local area network to which the vehicle is connected.

Advantageously, the detector system further includes sound and/or light indicator means.

BRIEF DESCRIPTION OF THE DRAWINGS

Other features and advantages of the apparatus of the invention will appear more clearly on reading the following description given by way of non-limiting indication and with reference to the accompanying drawings, in which.

DETAILED DESCRIPTION OF EMBODIMENTS

Figure 1:
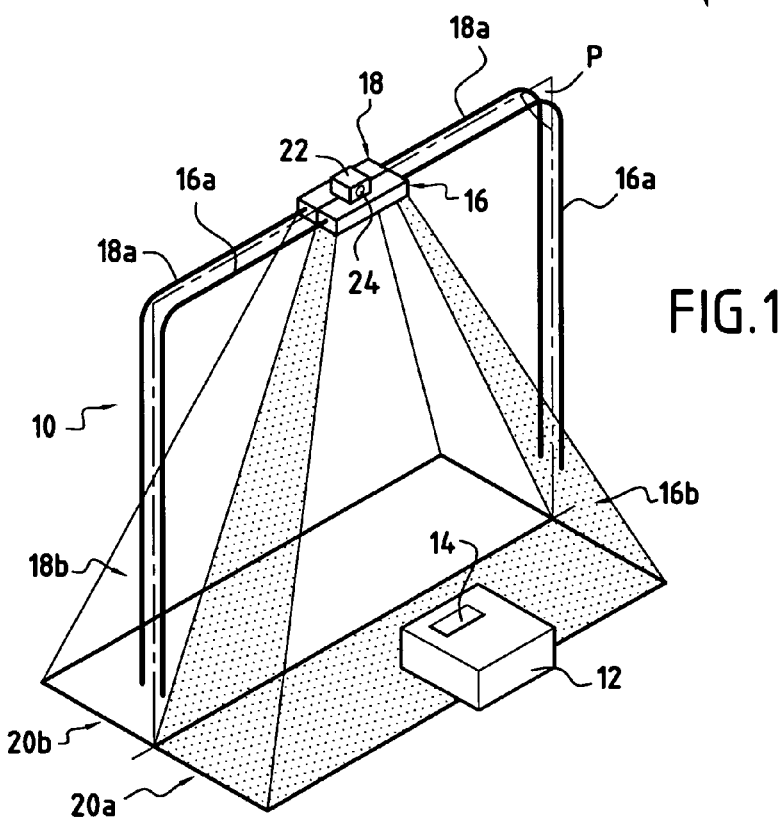
FIG. 1 is a very diagrammatic view of a detector system of the invention for detecting the direction in which an item passes through a boundary crossing zone.

In accordance with the invention, FIG. 1 shows a detector system 10 for detecting the direction in which an item 12 passes through a boundary crossing zone between two distinct spaces. By way of example, the item 12 is a parcel or a packet, and it includes electronic identification means or an RFID tag 14.

The detector system 10 includes a first read-interrogate element 16 having a first antenna 16a, and a second read-interrogate element 18 having a second antenna 18a. Each of the two antennas 16a, 18a can be in the form of a loop.

The two read-interrogate elements 16, 18 can be adjoining or separate as a function of the configuration of the boundary crossing zone. The first antenna 16a of the first read-interrogate element 16 defines a first detection lobe 16b, and the second antenna 18a of the second read-interrogate element 18 defines a second detection lobe 18b that does not overlap the first detection lobe 16b. At their closest, the two detection lobes 16b, 18b can be juxtaposed about a plane P separating the boundary crossing zone into a first region 20a and a second region 20b.

Thus, the first read-interrogate element 16 element monitors the first region 20a situated on one side of the boundary crossing zone and the second read-interrogate element 18 monitors the second region 20b situated on the other side of said boundary crossing zone.

In addition, the detection system 10 includes processor means 22 advantageously having a microprocessor and including memory means. Said processor means 22 are connected to the first and second read-interrogate elements 16, 18 in order to determine the travel direction of the item 12 as a function of the order in which it crosses the two regions 20a, 20b situated on either side of the boundary crossing zone.

With this double configuration, i.e. mere duplication of a conventional read-interrogate element, positioned at a crossing zone, it is very simple to determine the travel direction of the item 12 or an item of goods, depending on which of the two read-interrogate elements 16, 18 detects the RFID tag 14 of said item first. The detection sequence for detecting the RFID tag 14 thus gives the order in which the item passes through the two spaces on either side of the boundary crossing zone.

Naturally, the processor means 22 also determine identification data relating to the item 12, concerning, for example, the nature of the item, its weight, its destination address, etc.

In addition, the detector system 10 can advantageously include sound and/or light indicator means 24 presenting information concerning the item 12.

Figure 2:
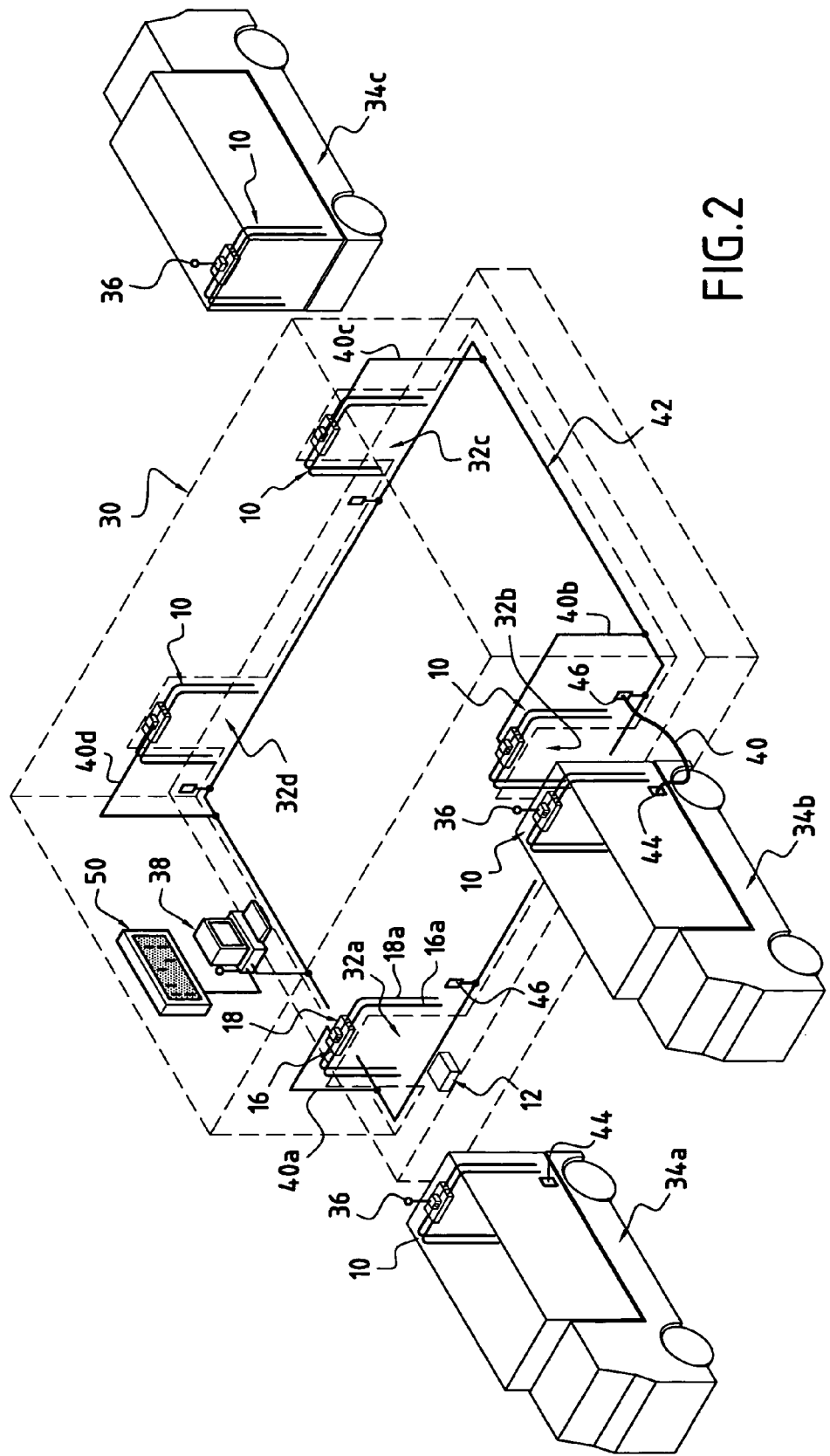
FIG. 2 is a very diagrammatic view of a unit provided with a plurality of detector systems as shown in FIG. 1.

FIG. 2 shows an example of a unit 30 for forwarding or dispatching items 12 such as parcels or packets arriving from various addresses and departing to various addresses.

This type of unit is encountered frequently on the premises of postal administrations or on the premises of private carriers such as DHL™ or UPS™.

The unit 30 is provided with entrance gantries (or "bay gates") 32a, 32b through which goods enter the unit 30 and exit gantries 32c, 32d through which the same goods exit. The entrance and/or exit gantries of the unit 30 define the boundary crossing zones.

The gantries towards which the unloading portions or rear portions of delivery tucks or goods transport vehicles 34a, 34b, 34c are directed are equipped with detector systems 10 for detecting the travel direction and identity tags of the goods under each of the above-mentioned gantries.

Thus, each gantry is provided with two read-interrogate elements 16, 18 and their associated antennas 16a, 18a which can be disposed around the entrance and/or exit gantries of the unit 30. The respective detection lobes of the antennas 16a, 18a do not overlap but rather they are touching at said boundary crossing zone and they extend in mutually opposite directions, namely, in this example, towards the inside and towards the outside of the unit 30, the boundary zone being constituted by the gantry 32a to 32d.

In addition, the detector system 10 advantageously includes wired communications means 40a, 40b, 40c, 40d for transmitting identification data and data relating to travel direction of the item 12 to remote management means 38 of the computer type, the data being transmitted between the wired communications means 40 and the management means 38 via a local area network 42. The management means 38 can themselves be connected to a remote server center (not shown) via a telecommunications network, e.g. the Internet. Thus, an operator at the remote server center can consult all of the information relating to the items passing through the unit.

Naturally, said wired communications means for transmitting the above-mentioned data to the remote management means can be replaced with wireless communications means of the Bluetooth or Wi-Fi type.

Figure 3:
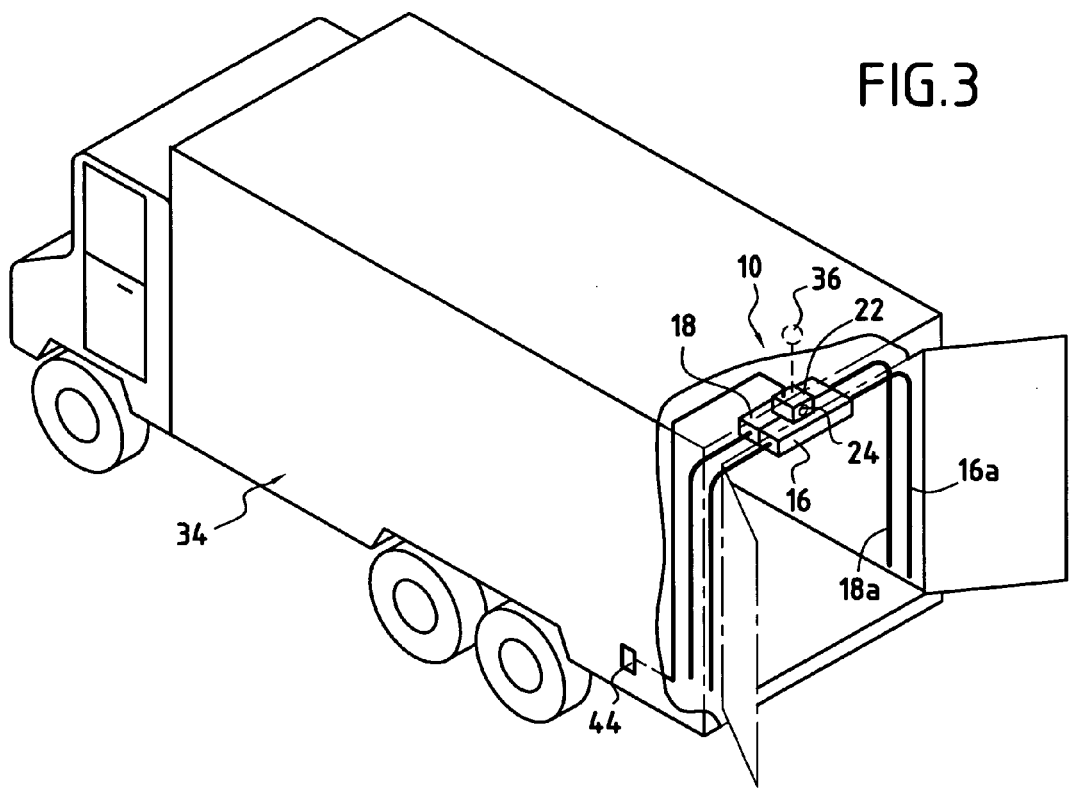
FIG. 3 is a very diagrammatic view of a goods vehicle provided with a detector system as shown in FIG. 1.

FIGS. 2 and 3 show that the detector system 10 can also be placed on a goods transport vehicle 34. In this preferred example, the boundary crossing zone is constituted by a vehicle loading/unloading door on the vehicle 34.

In this case, the antennas 16a, 18a of the read-interrogate elements 16, 18 are advantageously incorporated into the body structure of the vehicle, and they can be disposed around the loading/unloading door of the vehicle 34.

In this preferred example, the wired link means 40 can be constituted by an electrical cable connecting a first connector 44 disposed on the vehicle 34 to a second connector 46 disposed in the unit 30, thereby making it possible to transmit the information collected at the vehicle by the detector system 10 to the management means 38. However, said information can also be transmitted to the management means 38 directly via wireless link means 36 connected to the processor means 22 on the vehicle.

In addition, the sound or light indicator means 24 disposed at the loading/unloading doors of the vehicles 34 or at the entrance and/or exit gantries of the unit 30 can use a sound signal or a color visual signal to inform a goods-handler which vehicle loading station corresponds to the parcel or to the pallet transported by the vehicle. However, for the above-mentioned unit or for a transit area in which numerous vehicles are parked pending departure for various delivery addresses, it is preferable, in addition to said sound or light indicators, to provide a centralized display panel 50 indicating which determined exit gantry is associated with an item that has passed through a determined entrance gantry.

The goods handlers who unload the vehicles coming from various loading centers must distribute the transported items and such a centralized display panel makes it easier to inform the goods handlers of their appropriate destinations, situated just in front of the vehicles to be loaded.

A simple solution for implementing the centralized display panel consists in providing an LCD or plasma type screen with a plurality of rows corresponding to the determined number of entrance gantries (for unloading of the vehicles) and a plurality of columns corresponding to the determined number of exit gantries (for loading the vehicles). Naturally, a plurality of people can unload or load the same vehicle by using different gantries.

In the event of a routing error, an audible and/or visible alarm can then be triggered at the sound or light indicator of the exit gantry concerned. A specific color can also be assigned to each entrance gantry and to each exit gantry.

What is claimed is:

1. A goods transport vehicle including a detector system for detecting the direction in which an item passes through an opening of a loading/unloading door on the vehicle, wherein said detector system comprises:
    a first read-interrogate element including a first antenna having a first detection lobe, the first read interrogate element being located in the door of the vehicle and monitoring a first region situated on one side of said door;
    a second read-interrogate element including a second antenna having a second detection lobe that does not overlap the first detection lobe, the second read interrogate element being located in the door of the vehicle and monitoring a second region situated on the other side of said; and
    processor means connected to the first and second read-interrogate elements, the processor means determining the direction in which the item passes through as a function of the order in which said two regions are crossed.

2. A transport vehicle according to claim 1, wherein the processor means further determine identification data relating to the item.

3. A transport vehicle according to claim 1, wherein the detector system further includes wireless communications means for transmitting identification data and data relating to the travel direction of the item to management means external to the vehicle.

4. A transport vehicle according to claim 1, wherein the detector system further includes wired communications means for transmitting identification data and data relating to the travel direction of the item to management means external to the vehicle.

5. A transport vehicle according to claim 1, wherein the detector system further includes sound and/or light indicator means.

6. A transport vehicle according to claim 4, wherein the data is transmitted between the wired communications means and the management means via a local area network to which the vehicle is connected.

7. A transport vehicle according to claim 1, wherein said first and second antennas substantially surround the opening of the door.

8. A transport vehicle according to claim 1, where said first and second antennas extend along top and side portions of the opening of the door.

* * * * *